(12) United States Patent
Alliger

(10) Patent No.: US 11,708,430 B2
(45) Date of Patent: Jul. 25, 2023

(54) PRODUCTION OF RING POLYMERS FROM TERMINAL ALKYNES BY ALKYLIDYNES

(71) Applicant: ExxonMobil Chemical Patents Inc., Baytown, TX (US)

(72) Inventor: Glen E. Alliger, Houston, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 205 days.

(21) Appl. No.: 17/330,049

(22) Filed: May 25, 2021

(65) Prior Publication Data

US 2021/0395402 A1 Dec. 23, 2021

Related U.S. Application Data

(60) Provisional application No. 63/037,805, filed on Jun. 11, 2020.

(51) Int. Cl.
*C08F 4/78* (2006.01)
*C08F 30/04* (2006.01)

(52) U.S. Cl.
CPC ............. *C08F 4/78* (2013.01); *C08F 30/04* (2013.01)

(58) Field of Classification Search
CPC .................... C08F 4/78; C08F 30/04
See application file for complete search history.

(56) References Cited

U.S. PATENT DOCUMENTS 9,206,266 B2 12/2015 Veige et al. ............. C08F 4/78
2014/0309389 A1* 10/2014 Veige ...................... C08F 38/00
526/170

OTHER PUBLICATIONS

Furstner, A. (2013) "Alkyne Metathesis on the Rise," *Chem. Int. Ed.*, v.52(10), pp. 2794-2819.
Gonsales, S. A. et al. (2016) "Highly Tactic Cyclic Polynorbornene: Stereoselective Ring Expansion Metathesis Polymerization of Norbornene Catalyzed by a New Tethered Tungsten-Alkylidene Catalyst," *J. Am. Chem. Soc.*, v.138(15), pp. 4996-4999.
Jang, S. S. et al. (2003) "Effect of Cyclic Chain Architecture on Properties of Dilute Solutions of Polyethylene from Molecular Dynamics Simulations," *J. Chem. Phys.*, v.119(3), pp. 1843-1854.
(Continued)

*Primary Examiner* — Catherine S Branch

(57) ABSTRACT

This invention relates to a method comprising combining an alkylidyne catalyst compound and a terminal alkyne to form a ring polymer. The terminal alkyne has the formula $RC_2H$, wherein R is H, an alkyl group having from 1 to 20 carbon atoms, a cycloalkyl group having from 3 to 20 carbon atoms, an aromatic group having from 6 to 20 carbon atoms, an alkenyl group having from 2 to 20 carbon atoms, or an alkynyl group having from 2 to 20 carbon atoms. The alkylidyne catalyst compound has the formula $(R^1)(R^2)(R^3)MCR^4$, where M is tungsten or molybdenum, $R^1$, $R^2$, and $R^3$ is alkoxide, halide, oxide, nitride, or sulfide, and $R^4$ is H, an aliphatic group having from 1 to 20 carbons, an aromatic group having from 1 to 20 carbons, or a heteroaryl group having from 1 to 20 carbons, wherein the heteroatom is nitrogen, oxygen, boron, or sulfur.

19 Claims, 2 Drawing Sheets

(56) References Cited

OTHER PUBLICATIONS

Kricheldorf, H. R. (2010) "Cyclic Polymers: Synthetic Strategies and Physical Properties," *J. Polym. Sci. Part A: Polym. Chem.*, v.48(2), pp. 251-284.
Nadif, S. S. et al. (2016) "Introducing "Ynene" Metathesis: Ring-Expansion Metathesis Polymerization Leads to Highly Cis and Syndiotactic Cyclic of Norbomene," J. Am. Chem. Soc., v.138(20), pp. 6408-6411.
Niu, W. et al. (2019) "Polypropylene: Now Available without Chain Ends," *Chem.*, v.5, pp. 237-244.
Roland, C. D. et al. (2016) "Cyclic Polymers from Alkynes," *Nature Chem.*, v.8(8), pp. 791-796.
Roovers, J. (2000) "Organic Cyclic Polymers," *Cyclic Polymers*, 2nd ed., Chap. 10, pp. 347-384.
Schrock, R. R. et al. (1982) "Metathesis of Tungsten-Tungsten Triple Bonds with Acetylenes and Nitriles to Give Alkylidyne and Nitrido Complexes," *J. Am. Chem. Soc.*, v.104(15), pp. 4291-4293.
Wengrovius, J. H. et al. (1981) "Metathesis of Acetylenes by Tungsten(VI)-Alkylidyne Complexes," *J. Am. Chem. Soc.*, v.103(13), pp. 3932-3934,.

\* cited by examiner

US 11,708,430 B2

PRODUCTION OF RING POLYMERS FROM TERMINAL ALKYNES BY ALKYLIDYNES

CROSS REFERENCE TO RELATED APPLICATIONS

This application claims the benefit of and priority to U.S. Provisional Application No. 63/037,805 filed Jun. 11, 2020, the disclosure of which is incorporated herein by reference.

FIELD

The present disclosure relates to methods for producing ring polymers.

BACKGROUND

Ring polymers are unique in their topology compared to their equivalent linear analogues since ring polymers have no end groups. Furthermore, ring polymer chains in melts have a smaller radius of gyration, are more spherical, are more collapsed, and are spaced further apart compared to their equivalent linear analogues of the same chain length. Thus, ring polymers are more compact and interpenetrate with one another less than their equivalent linear analogues. For at least some of these reasons, ring polymers exhibit unique rheological and bulk properties compared to their equivalent linear analogues. For example, ring polymers diffuse faster than their equivalent linear analogues (e.g., ring polymers have higher self-diffusion coefficient times at the same chain length). Moreover, ring polymers have lower relaxation times than their equivalent linear analogues at the same chain length. The foregoing properties, namely faster diffusion and lower relaxation times, have made ring polymers useful in microfluidics, drug delivery, and functionalized gels. Ring polymers also exhibit higher bulk melting point and lower glass transition temperature compared to their equivalent linear analogues making ring polymers thermally stable for industrial processing and molding.

While the unique properties of ring polymers are potentially very useful in a wide range of commercial applications, ring polymers are vastly underutilized because they are very challenging to make. In that regard, synthesis of ring polymers typically involves high dilution conditions (on the order of about 1 mM or less) and long reaction times (on the order of about 48 h or greater). Moreover, use of high dilution chemistry results in very low yield. For at least some of these reasons, synthesis of ring polymers is not scalable to an industrial scale.

Furthermore, some methods that have been developed for forming ring polymers use hydrocarbons substituted with reactive end group functionalities (end cap groups) for ring closing. These methods add additional reagents (such as the end caps) and timely addition of the end caps to the reaction to provide the synthesis of a ring polymer of a desired size. Use of end caps can also result in ring polymers having heteroatom-substituted hydrocarbon groups, which might not be the desired chemical structure of the ring polymers for a particular end use.

Some catalyst systems have been developed that can form ring polymers without heteroatom-substituted hydrocarbon groups. However, these catalysts involve laborious synthesis and are not easily modified.

There is a need for developing methods of ring polymer synthesis that may overcome one or more of the above issues.

References for citing in an information disclosure statement under 37 C.F.R. 1.97(h): U.S. Pat. No. 9,206,266; Kricheldorf, H. R. (2010) "Cyclic Polymers: Synthetic Strategies and Physical Properties," *J. Polym. Sci. Part A: Polym. Chem.*, v. 48(2), pp. 251-284; Roovers, J. (2000) "Organic Cyclic Polymers," *Cyclic Polymers*, 2$^{nd}$ ed., Chap. 10, pp. 347-384; Jang, S. S. et al. (2003) "Effect of Cyclic Chain Architecture on Properties of Dilute Solutions of Polyethylene from Molecular Dynamics Simulations," *J. Chem. Phys.*, v. 119(3), pp. 1843-1854; Roland, C. D. et al. (2016) "Cyclic Polymers from Alkynes," *Nature Chem.*, v. 8(8), pp. 791-796; Wengrovius, J. H. et al. (1981) "Metathesis of Acetylenes by Tungsten(VI)-Alkylidyne Complexes,"*J. Am. Chem. Soc.*, v. 103(13), pp. 3932-3934; Schrock, R. R. et al. (1982) "Metathesis of Tungsten-Tungsten Triple Bonds with Acetylenes and Nitriles to Give Alkylidyne and Nitrido Complexes," *J. Am. Chem. Soc.*, v. 104(15), pp. 4291-4293; Furstner, A. (2013) "Alkyne Metathesis on the Rise," *Chem. Int. Ed.*, v. 52(10), pp. 2794-2819; Niu, W. et al. (2019) "Polypropylene: Now Available without Chain Ends," *Chem.*, v. 5, pp. 237-244; Nadif, S. S. et al. (2016) "Introducing "Ynene" Metathesis: Ring-Expansion Metathesis Polymerization Leads to Highly Cis and Syndiotactic Cyclic of Norbomene," *J. Am. Chem. Soc.*, v. 138(20), pp. 6408-6411; Gonsales, S. A. et al. (2016) "Highly Tactic Cyclic Polynorbornene: Stereoselective Ring Expansion Metathesis Polymerization of Norbomene Catalyzed by a New Tethered Tungsten-Alkylidene Catalyst," *J. Am. Chem. Soc.*, v. 138(15), pp. 4996-4999.

SUMMARY

In some embodiments, a method of forming a ring polymer includes combining an alkylidyne catalyst compound and a terminal alkyne to form a mixture under reaction conditions to form the ring polymer. The alkylidyne has the formula $(R^1)(R^2)(R^3)MCR^4$, where M is a metal selected from the group consisting of: tungsten and molybdenum, each of $R'$, $R^2$, and $R^3$ are independently selected from the group consisting of: alkoxide, halide, oxide, nitride, and sulfide, and $R^4$ is selected from the group consisting of: H, an aliphatic group having from 1 to 20 carbons, an aromatic group having from 1 to 20 carbons, and a heteroaryl group having from 1 to 20 carbons, wherein the heteroatom is selected from nitrogen, oxygen, boron, and sulfur.

In some embodiments, a method of forming a ring polymer includes forming a reaction mixture and mixing the reaction mixture under reaction conditions to form the ring polymer. Forming the reaction mixture includes introducing an alkylidyne to a reaction vessel and introducing a terminal alkyne to the reaction vessel. The alkylidyne has the formula $(R^1)(R^2)(R^3)MCR^4$, where M is a metal selected from the group consisting of: tungsten and molybdenum, each of $R^1$, $R^2$, and $R^3$ is independently selected from the group consisting of: alkoxide, halide, oxide, nitride, and sulfide, and $R^4$ is selected from the group consisting of: H, an aliphatic group having from 1 to 20 carbons, an aromatic group having from 1 to 20 carbons, and a heteroaryl group having from 1 to 20 carbons, wherein the heteroatom is selected from the group consisting of nitrogen, oxygen, boron, and sulfur.

In some embodiments, a method of forming a ring polymer includes: forming a reaction mixture and mixing the reaction mixture under reaction conditions to form the ring polymer. Forming the reaction mixture includes introducing an alkylidyne to a reaction vessel and introducing a terminal alkyne to the reaction vessel. The terminal alkyne has the formula $RC_2H$, wherein R is selected from the group consisting of: H, an alkyl group having from 1 to 20 carbon atoms, a cycloalkyl group having from 3 to 20 carbon atoms, an aromatic group having from 6 to 20 carbon atoms, an alkenyl group having from 2 to 20 carbon atoms, and an alkynyl group having from 2 to 20 carbon atoms.

BRIEF DESCRIPTION OF THE DRAWINGS

So that the manner in which the above recited features of the present disclosure can be understood in detail, a more particular description of the disclosure, briefly summarized above, may be had by reference to embodiments. Certain aspects of some embodiments are illustrated in the appended figures. It is to be noted, however, that the appended figures illustrate only exemplary embodiments, and therefore are not to be considered limiting of scope, and may admit to other equally effective embodiments.

DETAILED DESCRIPTION

Figure 1A:
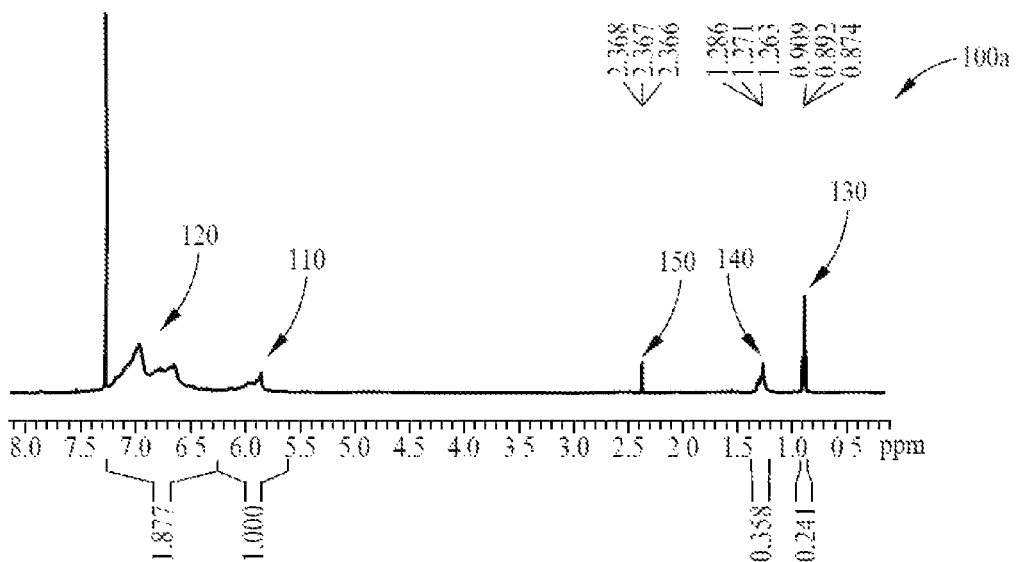
FIG. 1A is a $^1$H NMR spectrum illustrating formation of a ring poly(phenylacetylene), according to at least one embodiment.

The present disclosure relates to methods for producing ring polymers from terminal alkynes by alkylidynes. In at least one aspect, ring polymers of the present disclosure can be used in blends with various additional polymers, usually following hydrogenation of the ring polymers, to modify bulk properties of the additional polymers. In at least one aspect, ring polymers of the present disclosure can be used as lubricants or as viscosity modifiers in lubricants. In at least one aspect, a synthesis method of the present disclosure can be performed in neat monomer (e.g., in the absence of additional solvent), which improves yield. In at least one aspect, a synthesis method can provide good yield of ring polymer in relatively short reaction times. In at least one aspect, a synthesis method is scalable to industrial production processes. In at least one aspect, ring polymers of the present disclosure may optionally consist only of carbon and hydrogen atoms without heteroatom-substituted hydrocarbon groups. In at least one aspect, catalysts of the present disclosure are simple to make and can be easily modified.

The term "and/or" refers to both the inclusive "and" case and the exclusive "or" case, and such terms are used herein for brevity. For example, a composition comprising "A and/or B" may comprise A alone, B alone, or both A and B; and a composition comprising "A and or B" may comprise A alone, or both A and B.

The percentage of a particular monomer in a polymer is expressed herein as weight percent (wt %) based on the total weight of the polymer present. All other percentages are expressed as weight percent (wt %), based on the total weight of the particular composition present, unless otherwise noted. Room temperature is 25° C.±2° C. and atmospheric pressure is 101.325 kPa unless otherwise noted.

The term "consisting essentially of" in reference to a composition is understood to mean that the composition can include additional compounds other than those specified, in such amounts to the extent that they do not substantially interfere with the essential function of the composition.

For purposes herein a "polymer" refers to a compound having two or more "mer" units (see below for polyester mer units), that is, a degree of polymerization of two or more, where the mer units can be of the same or different species. A "homopolymer" is a polymer having mer units that are the same species. A "copolymer" is a polymer having two or more different species of mer units. A "terpolymer" is a polymer having three different species of mer units. "Different" in reference to mer units indicates that the mer units differ from each other by at least one atom or are different isomerically. Unless otherwise indicated, reference to a polymer herein includes a copolymer, a terpolymer, or any polymer comprising a plurality of the same or different species of repeating units.

As used herein, the prefixes di- and tri-generally refer to two and three, respectively. Similarly, the prefix "poly-" generally refers to two or more, and the prefix "multi-" to three or more.

The term "residue" or "unit", as used herein, means the organic structure of the monomer in its as-polymerized form as incorporated into a polymer, e.g., through polymerization of the corresponding monomer. Throughout the specification and claims, reference to the monomer(s) in the polymer is understood to mean the corresponding as-polymerized form or residue of the respective monomer.

As used herein, Mn is number average molecular weight, Mw is weight average molecular weight, and Mz is z average molecular weight, wt % is weight percent, and mol % is mole percent. Molecular weight distribution, also referred to as polydispersity index (PDI), is defined to be Mw divided by Mn. Unless otherwise noted, all molecular weight units (e.g., Mw, Mn, Mz) are reported in units of g/mol. The following abbreviations may be used herein: Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, and Ph is phenyl.

For purposes herein, a "catalyst system" is the combination of at least one catalyst compound and an optional support material. For purposes of the present disclosure, when catalyst systems are described as comprising neutral stable forms of the components, it is well understood by one of ordinary skill in the art, that the ionic form of the component is the form that reacts with the monomers to produce polymers.

For purposes herein, ASTM refers to the American Society for Testing and Materials; it is to be understood that when an ASTM method is referred to for use in characterizing a property of a sample, the ASTM method referred to is the current revision of the ASTM method in force at the time of filing of this application, unless otherwise indicated.

For the purposes of the present disclosure, the numbering scheme for the Periodic Table Groups is used as described in Chemical and Engineering News, v. 63(5), pg. 27 (1985), e.g., a "group 6 metal" is an element from group 6 of the Periodic Table, e.g. Cr, Mo, W.

For purposes of the present disclosure, the terms "aliphatic" or "aliphatic group" mean a non-aromatic hydrocarbon. Aliphatics of the present disclosure can be linear, branched or cyclic, saturated or unsaturated, substituted or unsubstituted. The term "heteroatom" means an atom other than hydrogen and carbon, such as for example, nitrogen, oxygen, boron, sulfur, halogen, silicon, or the like.

The terms "hydrocarbyl radical," "hydrocarbyl" and "hydrocarbyl group" are used interchangeably throughout this document. Likewise the terms "group," "radical," and "substituent" are also used interchangeably in this document. For purposes of this disclosure, "hydrocarbyl radical" is defined to be a radical, which contains hydrogen atoms and up to 50 carbon atoms and which may be linear, branched, or cyclic, and when cyclic, aromatic or non-aromatic. Hydrocarbyls of the present disclosure can be substituted or unsubstituted.

Substituted hydrocarbyl radicals are radicals in which at least one hydrogen atom has been substituted with at least one functional group such as $NR^x{_2}$, $OR^x$, $SeR^x$, $TeR^x$, $PR^x{_2}$, $AsR^x{_2}$, $SbR^x{_2}$, $SR^x$, $BR^x$ and the like or where at least one non-hydrocarbon atom or group has been inserted within the hydrocarbyl radical, such as —O—, —S—, —Se—, —Te—, —N($R^x$)—, =N—, —P($R^x$)—, =P—, —As($R^x$)—, =As—, —Sb($R^x$)—, =Sb—, —B($R^x$)—, =B— and the like, where $R^x$ is independently a hydrocarbyl or halocarbyl radical, and two or more $R^x$ may join together to form a substituted or unsubstituted saturated, partially unsaturated or aromatic cyclic or polycyclic ring structure. Examples of a substituted hydrocarbyls would include —CH$_2$CH$_2$—O—CH$_3$ and —CH$_2$—NMe$_2$ where the radical is bonded via the carbon atom, but would not include groups where the radical is bonded through the heteroatom such as —OCH$_2$CH$_3$ or —NMe$_2$.

Silylcarbyl radicals are radicals in which one or more hydrocarbyl hydrogen atoms have been substituted with at least one $SiR*_3$ containing group or where at least one —Si(R*)$_2$— has been inserted within the hydrocarbyl radical where R* is independently a hydrocarbyl or halocarbyl radical, and two or more R* may join together to form a substituted or unsubstituted saturated, partially unsaturated or aromatic cyclic or polycyclic ring structure.

Substituted silylcarbyl radicals are radicals in which at least one hydrogen atom has been substituted with at least one functional group such as NR*$_2$, OR*, SeR*, TeR*, PR*$_2$, AsR*$_2$, SbR*$_2$, SR*, BR*$_2$, GeR*$_3$, SnR*$_3$, PbR*$_3$ and the like or where at least one non-hydrocarbon atom or group has been inserted within the silylcarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Ge(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure. Substituted silylcarbyl radicals are only bonded via a carbon or silicon atom.

Germylcarbyl radicals are radicals in which one or more hydrocarbyl hydrogen atoms have been substituted with at least one $GeR*_3$ containing group or where at least one —Ge(R*)$_2$— has been inserted within the hydrocarbyl radical where R* independently a hydrocarbyl or halocarbyl radical, and two or more R* may join together to form a substituted or unsubstituted saturated, partially unsaturated or aromatic cyclic or polycyclic ring structure. Substituted germylcarbyl radicals are only bonded via a carbon or germanium atom.

Substituted germylcarbyl radicals are radicals in which at least one hydrogen atom has been substituted with at least one functional group such as NR*$_2$, OR*, SeR*, TeR*, PR*$_2$, AsR*$_2$, SbR*$_2$, SR*, BR*$_2$, SiR*$_3$, SnR*$_3$, PbR*$_3$ and the like or where at least one non-hydrocarbon atom or group has been inserted within the germylcarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure.

Halocarbyl radicals are radicals in which one or more hydrocarbyl hydrogen atoms have been substituted with at least one halogen (e.g. F, Cl, Br, I) or halogen-containing group (e.g. CF$_3$).

Substituted halocarbyl radicals are radicals in which at least one halocarbyl hydrogen or halogen atom has been substituted with at least one functional group such as NR*$_2$, OR*, SeR*, TeR*, PR*$_2$, AsR*$_2$, SbR*$_2$, SR*, BR*$_2$ and the like or where at least one non-carbon atom or group has been inserted within the halocarbyl radical such as —O—, —S—, —Se—, —Te—, —N(R*)—, =N—, —P(R*)—, =P—, —As(R*)—, =As—, —Sb(R*)—, =Sb—, —B(R*)—, =B— and the like, where R* is independently a hydrocarbyl or halocarbyl radical provided that at least one halogen atom remains on the original halocarbyl radical. Additionally, two or more R* may join together to form a substituted or unsubstituted saturated, partially unsaturated or aromatic cyclic or polycyclic ring structure. Substituted halocarbyl radicals are only bonded via a carbon atom.

The term "aryl" or "aryl group" or "aromatic group" means a monocyclic or polycyclic aromatic ring and the substituted variants thereof, including but not limited to, phenyl, naphthyl, 2-methyl-phenyl, xylyl, 4-bromo-xylyl. Likewise "heteroaryl" means an aryl group where a ring carbon atom (or two or three ring carbon atoms) has been replaced with a heteroatom, such as N, O, or S. The term "substituted aryl" means: 1) an aryl group where a hydrogen has been replaced by a substituted or unsubstituted hydrocarbyl group, a substituted or unsubstituted halocarbyl group, a substituted or unsubstituted silylcarbyl group, or a substituted or unsubstituted germylcarbyl group. The term "substituted heteroaryl" means: 1) a heteroaryl group where a hydrogen has been replaced by a substituted or unsubstituted hydrocarbyl group, a substituted or unsubstituted halocarbyl group, a substituted or unsubstituted silylcarbyl group, or a substituted or unsubstituted germylcarbyl group.

For purposes of the present disclosure, "alkoxides" include those where the alkyl group is a $C_1$ to $C_{20}$ hydrocarbyl. The alkyl group may be straight chain, branched, or cyclic. The alkyl group may be saturated or unsaturated. In some embodiments, the alkyl group may comprise at least one aromatic group.

"Alkyne" as used herein is a compound having at least one carbon-carbon triple bond.

"Alkylidyne" as used herein is a compound having at least one carbon-metal triple bond.

For properties recited herein that reference comparisons of a ring polymer to its corresponding linear counterpart (such as Tm and ratio of radii of gyration), the linear counterparts described herein may be synthesized (for determination of the desired property) according to T. Taniguchi, et al. "*Facile and Versatile Synthesis of End-Functionalized Poly(phenylacetylene)s: A Multicomponent Catalystic System for Well-Controlled Living Polymerization of Phenylacetylenes*", Angewandte Chemie, Int'l Ed., (Feb. 10, 2020). For property determination, a corresponding linear polymer should have an Mw, an Mw/Mn, and conomomer content that are +/−3% that of the Mw, Mw/Mn and comonomer content of the corresponding ring polymer of interest.

Terminal Alkynes

Terminal alkynes of the present disclosure can have the formula $RC_2H$. In at least one embodiment, R is selected from H, an alkyl group having from 1 to 20 carbon atoms, a cycloalkyl group having from 3 to 20 carbon atoms, an aromatic group having from 6 to 20 carbon atoms, an alkenyl group having from 2 to 20 carbon atoms, an alkynyl group having from 2 to 20 carbon atoms, and combination(s) thereof.

In at least one embodiment, R is an alkyl group having from 1 to 20 carbons, such as from 1 to 4 carbons, alternatively from 5 to 8 carbons, alternatively from 9 to 12 carbons, alternatively from 13 to 16 carbons, alternatively from 17 to 20 carbons.

In at least one embodiment, R is a cycloalkyl group having from 3 to 20 carbons, such as from 3 to 4 carbons, alternatively from 5 to 8 carbons, alternatively from 9 to 12 carbons, alternatively from 13 to 16 carbons, alternatively from 17 to 20 carbons.

In at least one embodiment, R is an aromatic group having from 6 to 20 carbons, such as from 6 to 8 carbons, alternatively from 9 to 12 carbons, alternatively from 13 to 16 carbons, alternatively from 17 to 20 carbons.

In at least one embodiment, R is an alkenyl group having from 2 to 20 carbons, such as from 2 to 4 carbons, alternatively from 5 to 8 carbons, alternatively from 9 to 12 carbons, alternatively from 13 to 16 carbons, alternatively from 17 to 20 carbons.

In at least one embodiment, R is an alkynyl group having from 2 to 20 carbons, such as from 2 to 4 carbons, alternatively from 5 to 8 carbons, alternatively from 9 to 12 carbons, alternatively from 13 to 16 carbons, alternatively from 17 to 20 carbons. In at least one embodiment, an alkynyl moiety can form a network of cross-linked ring polymers.

In at least one embodiment, R is a $C_1$-$C_{20}$ aliphatic group, such as a $C_1$-$C_4$ aliphatic group, alternatively a $C_5$-$C_8$ aliphatic group, alternatively a $C_9$-$C_{12}$ aliphatic group, alternatively a $C_{13}$-$C_{16}$ aliphatic group, alternatively a $C_{17}$-$C_{20}$ aliphatic group. In at least one embodiment, R is a saturated aliphatic group. In at least one embodiment, R is an unsaturated aliphatic group.

In at least one embodiment, R is substituted with a heteroatom selected from halogen, oxygen, nitrogen, sulfur, silicon, and combination(s) thereof.

In at least one embodiment, a terminal alkyne is phenylacetylene. In at least one embodiment, a terminal alkyne is a substituted phenylacetylene, which is functionalized. Functionalized phenylacetylene can form a cyclic polymer (having functional groups) that can be further reacted at the functional groups. For example, the functional group(s) of a cyclic polymer can be reacted such that the cyclic polymer is the core structure of a dendrimer. In at least one embodiment, a terminal alkyne is selected from phenylacetylene, 1-ethynylnaphthalene, and combination(s) thereof.

In at least one embodiment, a terminal alkyne is 1-decyne. In at least one embodiment, a terminal alkyne is selected from acetylene, propyne, 1-butyne, 1-pentyne, 1-hexyne, 1-heptyne, 1-octyne, 1-nonyne, 1-decyne, 1-undecyne, 1-dodecyne, 1-tridecyne, 1-tetradecyne, 1-pentadecyne, 1-hexadecyne, 1-heptadecyne, 1-octadecyne, 1-nonadecyne, 1-icosyne, and combination(s) thereof.

In at least one embodiment, a terminal alkyne consists of carbon and hydrogen.

In at least one embodiment, a terminal alkyne is in solution having about 50 wt % or greater of the terminal alkyne, such as from about 50 wt % to about 100 wt %, such as from about 70 wt % to about 100 wt %, such as from about 90 wt % to about 100 wt %. In at least one embodiment, a solvent is selected from benzene, toluene, pentane, isohexane, hexane, heptane, diethyl ether, tetrahydrofuran, dimethoxyethane, dichloromethane, and combination(s) thereof.

Alkylidyne Catalyst Compounds

Alkylidyne catalyst compounds of the present disclosure can have the formula $(R^1)(R^2)(R^3)MCR^4$. C is triple bonded to M (e.g., $(R^1)(R^2)(R^3)M≡CR^4$). In at least one embodiment, M is a metal selected from tungsten, molybdenum, chromium, and combination(s) thereof. In at least one embodiment, M is a group 6 metal, such as Cr, Mo or W. In at least one embodiment, each of $R^1$, $R^2$, and $R^3$ are independently selected from substituted or unsubstituted alkoxide, halide, oxide, nitride, and sulfide. In at least one embodiment, an alkoxide can have the formula RO— where R is a $C_1$ to $C_{10}$ alkyl group. The alkyl group may be straight chain, branched, or cyclic. The alkyl group may be saturated or unsaturated. In some embodiments, the alkyl group may comprise at least one aromatic group. In at least one embodiment, each of $R^1$, $R^2$, and $R^3$ are independently substituted or unsubstituted. In at least one embodiment, $R^4$ is selected from H, an aliphatic group having from 1 to 20 carbon atoms, and combination(s) thereof. In at least one embodiment, $R^4$ is a $C_1$-$C_{20}$ aliphatic group, such as a $C_1$-$C_4$ aliphatic group, alternatively a $C_5$-$C_8$ aliphatic group, alternatively a $C_9$-$C_{12}$ aliphatic group, alternatively a $C_{13}$-$C_{16}$ aliphatic group, alternatively a $C_{17}$-$C_{20}$ aliphatic group. In at least one embodiment, $R^4$ is a saturated aliphatic group. In at least one embodiment, $R^4$ is an unsaturated aliphatic group. In at least one embodiment, $R^4$ is an aromatic group having from 1 to 20 carbon atoms. In at least one embodiment, $R^4$ is an aromatic group having from 6 to 20 carbons, such as from 6 to 8 carbons, alternatively from 9 to 12 carbons, alternatively from 13 to 16 carbons, alternatively from 17 to 20 carbons. In at least one embodiment, $R^4$ is substituted with a heteroatom selected from halogen, oxygen, nitrogen, sulfur, and combination(s) thereof.

In at least one embodiment, an alkylidyne catalyst compound is tris(t-butoxy)tungsten neopentylidyne. In at least one embodiment, an alkylidyne catalyst compound is tris(t-butoxy)tungsten propylidyne.

Synthesis of Alkylidyne Catalyst Compounds

Alkylidyne catalyst compounds of the present disclosure may be synthesized according to a method the same as or similar to the following example. $W(CCMe_3)Np_3$ ($Np=CH_2CMe_3$) can be prepared, typically in 50-70% yield, by adding $W(OMe)_3Cl_3$ to 6 equiv. of NpMgCl in ether. $W(CCMe_3)Np_3$ can react with 3 equiv. of HCl in the presence of $NEt_4Cl$ to give $[NEt_4][W(CCMe_3)Cl_4]$ and in the presence of dme to give $W(CCMe_3)(dme)Cl_3$ (dme=1, 2-dimethoxyethane). The several phosphine adducts of $W(CCMe_3)Cl_3$ which have been prepared include $W(CCMe_3)(L)Cl_3$ (L=$PEt_3$ or $PMe_3$), $W(CCMe_3)(PMe_3)_2Cl_3$, and $W(CCMe_3)(PMe_3)_3C_{13}$. Reactions between $[NE_t]$ or $W(CCMe_3)(dme)C_{13}$ and LiX (X=$OCMe_3$, $NMe_2$, N-i-$Pr_2$, or $SCMe_3$) can give the volatile, pale yellow to white, monomeric complexes, $W(CCMe_3)X_3$. Alternatively, catalysts of the present disclosure may be made using tungsten hexacarbonyl as a starting material. Treatment of tungsten hexacarbonyl with a hydrocarbyllithium $R^xLi$ and subsequent electrophile yields an oxygen-substituted carbine of the tungsten pentacarbonyl fragment, which can then be treated consecutively with boron tribromide, bromine, and dimethoxyethane to yield R$^x$CWBr3(dme). Treatment of this molecule with LiX as above yields monomeric alkylidynes as above. Alternatively, a compound containing an unsupported tungsten-tungsten triple bond, such as $W_2(OCMe_3)_6$, can be treated with a nitrile such as pivalonitrile to yield one equivalent of the nitride complex $NW(OCMe_3)_3$ and one equivalent of the desired alkylidyne, $W(CCMe_3)(OCMe_3)_3$. The nitride is easily separated away from the desired product. Alternatively, a compound containing an unsupported tungsten-tungsten triple bond, such as $W_2(OCMe_3)_6$, can be treated with an excess of asymmetrical internal alkyne and allowed to equilibrate under vacuum to yield an alkylidyne containing the heavier alkyne substituent, while the volatile internal alkyne that is formed is removed by vacuum. Note that the formed internal alkyne is both different from the internal alkyne starting material, and is necessarily volatile.

Polymerization Methods

Ring polymers of the present disclosure can be produced using methods where a terminal alkyne is introduced to a catalyst system comprising the result of the combination of an optional support and a catalyst compound. The catalyst compound and optional support may be combined in any order, and are combined typically prior to contacting with the terminal alkyne.

In at least one embodiment, a method to produce a ring polymer can include a catalytic ring expansion polymerization of a terminal alkyne using a suitable catalyst.

Polymerization methods of the present disclosure can include combining a terminal alkyne and an alkylidyne catalyst compound to form a mixture. In at least one embodiment, a molar ratio of a terminal alkyne to an alkylidyne catalyst compound in the mixture is about 100 or greater, such as from about 100 to about 10,000, such as from about 250 to about 10,000, such as from about 100 to about 400, alternatively from about 400 to about 600, alternatively from about 600 to about 1,000. In at least one embodiment, a concentration of an alkylidyne catalyst compound in the mixture is about 1 mg/ml or greater, such as from about 1 mg/ml to about 50 mg/ml, such as from about 4 mg/ml to about 40 mg/ml, such as from about 4 mg/ml to about 20 mg/ml, such as from about 4 mg/ml to about 12 mg/ml, such as from about 8 mg/ml to about 9 mg/ml.

Terminal alkynes and alkylidyne catalyst compounds of the present disclosure can be combined in any order. In at least one embodiment, an alkylidyne catalyst compound is added first to a reaction vessel, and a terminal alkyne is added second to the reaction vessel. In at least one other embodiment, a terminal alkyne is added first to a reaction vessel, and an alkylidyne catalyst compound is added second to the reaction vessel. In at least one embodiment, an alkylidyne catalyst compound is a solution having about 50 wt % or greater of the alkylidyne catalyst compound, such as from about 50 wt % to about 99 wt %, such as from about 70 wt % to about 99 wt %, such as from about 90 wt % to about 99 wt %. In at least one embodiment, a solvent is selected from benzene, toluene, pentane, isohexane, hexane, heptane, diethyl ether, tetrahydrofuran, dimethoxyethane, dichloromethane, and combination(s) thereof.

In at least one embodiment a mixture of catalyst and terminal alkyne is stirred under reaction conditions to form a ring polymer. In at least one embodiment, the mixture is substantially free of solvent (e.g., where solvent is present at 5 wt % or less, or 4 wt % or less, or 3 wt % or less, or 2 wt % or less, or 1 wt % or at 0 wt %, based upon the weight of the solution). In at least one embodiment, a mixture includes a solvent. In at least one embodiment, a solvent is selected from benzene, toluene, pentane, isohexane, hexane, heptane, diethyl ether, tetrahydrofuran, dimethoxyethane, dichloromethane, and combination(s) thereof. In at least one embodiment, a solvent is selected from straight and branched-chain hydrocarbons, cyclic and alicyclic hydrocarbons, perhalogenated hydrocarbons, aromatic and alkyl substituted aromatic compounds, aliphatic hydrocarbon solvents, and combination(s) thereof.

In at least one embodiment, reaction conditions include a time of about 0.25 hour or greater, such as from about 0.25 hour to about 4 hours, such as from about 0.25 hour to about 1 hour, alternatively about 0.5 hour or greater, such as from about 0.5 hour to about 4 hours, such as from about 0.5 hour to about 1 hour, alternatively from about 4 hours or greater, such as from about 8 hours or greater, such as from about 8 hours to about 24 hours, such as from about 12 hours to about 20 hours, such as from about 16 hours to about 20 hours, alternatively of about 8 hours or less, such as from about 2 hours to about 8 hours, such as from about 4 hours to about 7 hours. In at least one embodiment, reaction conditions include a temperature of about room temperature or greater, such as about 23° C. or greater, such as from about 23° C. to about 30° C., such as from about 25° C. to about 30° C. In at least one embodiment, a temperature is from about 20° C. to about 30° C., such as about room temperature. In at least one embodiment, reaction conditions include a pressure of about ambient pressure or greater, such as from about 14.7 psi to about 50 psi, such as from about 14.7 psi. Polymerization methods of the present disclosure can be run for any length and/or at any temperature and/or pressure suitable to obtain the desired ring polymers.

Reaction Workup

A reaction workup of the present disclosure can include steps selected from quenching, diluting, precipitating, filtering, washing, drying and combination(s) thereof. In at least one embodiment, a mixture is quenched with a quenching reagent, such as a protic molecule, such as 1-octanol. In at least one embodiment, a suitable quenching agent can be or include any suitably acidic reagent, such as an acid (e.g., protic acid), an alcohol, a phenol, or combination(s) thereof. In at least one embodiment, a volume of a quenching reagent may be about 50 vol % or less, such as from about 1 vol % to about 50 vol %, such as from about 10 vol % to about 30 vol %, such as about 20 vol %.

In at least one embodiment, a mixture is diluted with any suitable solvent that is miscible with the polymer product. For example, when the polymer product is poly(phenylacetylene), a suitable solvent may be toluene. In at least one embodiment, an excess volume of diluting solvent may be about 1× excess or greater, such as from about 2× excess to about 20× excess, such as from about 2× excess to about 10× excess, such as from about 5× excess to about 10× excess, alternatively from about 2× excess to about 5× excess. In at least one embodiment, a volume of the mixture in a diluting solvent may be about 50 vol % or less, such as from about 1 vol % to about 50 vol %, such as from about 5 vol % to about 40 vol %, such as from about 10 vol % to about 20 vol %, alternatively from about 20 vol % to about 30 vol %, alternatively from about 30 vol % to about 40 vol %.

In at least one embodiment, a polymer product is precipitated with any suitable solvent that is immiscible with the polymer product. For example, when the polymer product is poly(phenylacetylene), a suitable solvent may be a $C_4$-$C_{20}$ aliphatic hydrocarbon, such as pentane. In at least one embodiment, a diluted mixture may be added dropwise to pentane to precipitate the polymer product. In at least one embodiment, a volume of pentane relative to the diluted mixture may be about 2× excess or greater, such as from about 2× excess to about 20× excess, such as from about 5× excess to about 15× excess, such as about 10× excess.

In at least one embodiment, a polymer product is collected via filtration. In at least one embodiment, a polymer product is washed with acetone. In at least one embodiment, a polymer product is dried (e.g., in a vent hood) for a time of about 8 hours or greater, such as from about 8 hours to about 24 hours. In at least one embodiment, a polymer product is dried in a vacuum oven at a temperature of from about 60° C. to about 120° C., such as from about 90° C. In at least one embodiment, a polymer product is dried in the vacuum oven for a time of about 8 hours or greater, such as from about 8 hours to about 24 hours.

In at least one embodiment, an industrial scale method can include removing excess monomer by flash evaporation. In at least one embodiment, the flash evaporation may be induced by heating the mixture and/or applying a vacuum pressure.

In at least one embodiment, an industrial scale finishing method may include one or more of washing the mixture with a suitable solvent and/or collecting the polymer product by filtration.

Polymer Products

Polymer products of the present disclosure can include a ring polymer. In at least one embodiment, a reaction yield (g ring polymer/g terminal alkyne) is about 10% or greater, such as from about 10% to about 50%, such as from about 20% to about 30%.

In at least one embodiment, a ring polymer is a ring polyalkyne. In at least one embodiment, a ring polymer is selected from ring poly(phenylacetylene), ring poly(ethynylnaphthalene), ring poly(acetylene), ring poly(propyne), ring poly(l-butyne), ring poly(1-pentyne), ring poly(1-hexyne), ring poly(1-heptyne), ring poly(1-octyne), ring poly(1-nonyne), ring poly(1-decyne), ring poly(1-undecyne), ring poly(1-dodecyne), ring poly(1-tridecyne), ring poly(1-tetradecyne), ring poly(1-pentadecyne), ring poly(1-hexadecyne), ring poly(1-heptadecyne), ring poly(1-octadecyne), ring poly(1-nonadecyne), ring poly(1-icosyne), and combination(s) thereof.

In at least one embodiment, a size of a ring polymer is about 25 mer units or greater, such as from about 25 mer units to about 75 mer units, such as from about 35 mer units to about 65 mer units, such as from about 45 mer units to about 55 mer units, such as from about 50 mer units to about 55 mer units.

In at least one embodiment, a maximum size of a ring polymer is about 200 mer units or greater, such as from about 200 mer units to about 400 mer units, such as from about 250 mer units to about 350 mer units, such as from about 275 mer units to about 325 mer units, such as about 300 mer units, alternatively from about 250 mer units to about 300 mer units, alternatively from about 300 mer units to about 350 mer units.

Gel Permeation Chromatography (GPC)

Unless otherwise indicated, the distribution and the moments of molecular weight (Mw, Mn, Mz, Mw/Mn, etc.) are determined by using an Agilent 1260 Infinity II Multi-Detector System equipped with a refractive index detector, multiple wavelength UV-Vis detector, light scattering detector and viscometer. Three Agilent PLgel 5-μm Mixed-C columns are used to provide polymer separation. The mobile phase is THF (99.9+%-grade) with 250 ppm BHT as stabilizer, with a nominal flow rate of ~1.0 mL/min and a nominal injection volume of ~200 μL. The samples are run at low temperature, typically around 40° C. A given amount of sample is weighed and sealed in a standard vial. The sample solution concentration is from ~0.2 to ~2.0 mg/ml, with lower concentrations used for higher molecular weight samples. The concentration, c, at each point in the chromatogram is calculated from the baseline-subtracted signal, I, using the equation: c=αI, where a is the mass constant. The mass recovery can be calculated from the ratio of the integrated area of the concentration chromatography over elution volume and the injection mass which is equal to the pre-determined concentration multiplied by injection loop volume. The conventional molecular weight (MW) is determined by combining universal calibration relationship with the column calibration which is performed with a series of monodispersed polystyrene (PS) standards ranging from 160 to 3.8M gm/mole. The MW at each elution volume is calculated with following equation:

$$\log M = \frac{\log(K_{PS}/K)}{\alpha+1} + \frac{\alpha_{PS}+1}{\alpha+1}\log M_{PS}$$

where the variables with subscript "PS" stand for polystyrene while those without a subscript are for the test samples. In this method, $\alpha_{PS}$=0.67 and $K_{PS}$=0.000175. α and K for other materials are as calculated in the published in literature, except that for purposes of this present disclosure and claims thereto, α is 0.61 and K is 0.000175 for linear polyphenylacetylene polymers. Concentrations are expressed in g/cm³, molecular weight is expressed in g/mole, and intrinsic viscosity (hence K in the Mark-Houwink equation) is expressed in dL/g unless otherwise noted.

The LS detector is an Agilent 1260 Infinity MDS Light Scattering. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration, $A_2$ is the second virial coefficient, $P(\theta)$ is the form factor for a monodisperse random coil, and $K_O$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system, n is the refractive index of THF at 40° C. and λ=658 nm.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, [η], at each point in the chromatogram is calculated from the equation $[\eta]=\eta_S/c$, where c is concentration and is determined from the IRS broadband channel output. The viscosity MW at each point is calculated as $M=K_{PS}M^{\alpha_{PS}+1}/[\eta]$, where $\alpha_{ps}$ is 0.67 and $K_{ps}$ is 0.000175.

In at least one embodiment, an Mn of a ring polymer is about 1,000 g/mol or greater, such as from about 1,000 g/mol to about 100,000 g/mol, such as from about 1,000 g/mol to about 25,000 g/mol, such as from about 1,000 g/mol to about 10,000 g/mol, such as from about 2,000 g/mol to about 5,000 g/mol, such as from about 2,500 g/mol to about 4,000 g/mol, such as from about 3,000 g/mol to about 3,500 g/mol, such as from about 3,100 g/mol to about 3,200 g/mol, alternatively from about 3,200 g/mol to about 3,300 g/mol, alternatively from about 3,300 g/mol to about 3,400 g/mol, alternatively from about 3,400 g/mol to about 3,500 g/mol.

In at least one embodiment, an Mw of a ring polymer is about 1,000 g/mol or greater, such as from about 1,000 g/mol to about 200,000 g/mol, such as from about 1,000 g/mol to about 50,000 g/mol, such as from about 1,000 g/mol to about 10,000 g/mol, such as from about 4,000 g/mol to about 7,000 g/mol, such as from about 4,500 g/mol to about 6,000 g/mol, such as from about 5,000 g/mol to about 5,500 g/mol, such as from about 5,200 g/mol to about 5,300 g/mol, alternatively from about 5,300 g/mol to about 5,400 g/mol, alternatively from about 5,200 g/mol to about 5,700 g/mol, such as from about 5,400 g/mol to about 5,600 g/mol, such as from about 5,450 g/mol to about 5,550 g/mol.

In at least one embodiment, an Mz of a ring polymer is about 1,000 g/mol or greater, such as from about 1,000 g/mol to about 1,000,000 g/mol, such as from about 1,000 g/mol to about 100,000 g/mol, such as from about 1,000 g/mol to about 10,000 g/mol, such as from about 6,000 g/mol to about 10,000 g/mol, such as from about 7,000 g/mol to about 9,000 g/mol, such as from about 7,000 g/mol to about 8,000 g/mol, such as from about 7,600 g/mol to about 7,700 g/mol, alternatively from about 8,000 g/mol to about 9,000 g/mol, such as from about 8,400 g/mol to about 8,500 g/mol.

In at least one embodiment, a polydispersity index (Mw/Mn) of a ring polymer is about 3 or less, such as from about 1 to about 3, such as from about 1 to about 2.5, such as from about 1.25 to about 2.25, such as from about 1.5 to about 2, such as from about 1.5 to about 1.8, such as from about 1.5 to about 1.6, alternatively from about 1.6 to about 1.7, alternatively from about 1.7 to about 1.8, alternatively from about 1.8 to about 1.9, alternatively from about 1.9 to about 2.

In at least one embodiment, a heteroatom content of a ring polymer is very low, such as less than 10 wt %, such as less than 5 wt %, such as less than 1 wt %, such as less than 0.5 wt %, such as less than 0.1 wt %, such as from about 0.01 wt % to about 10 wt %, such as from 0.01 wt % to about 5 wt %, such as from 0.01 wt % to about 1 wt %, such as from 0.01 wt % to about 0.5 wt %, alternatively 0 wt %.

In at least one embodiment, a linear polymer byproduct may be formed such that the ring polymer (product that is formed) has a linear polymer content. In at least one embodiment, a linear polymer byproduct is an equivalent linear analogue of a ring polymer. In at least one embodiment, a linear polymer content is less than 10 wt %, such as less than 5 wt %, such as less than 1 wt %, such as less than 0.5 wt %, such as less than 0.1 wt %, such as from about 0.01 wt % to about 10 wt %, such as from 0.01 wt % to about 5 wt %, such as from about 0.01 wt % to about 1 wt %, such as from 0.01 wt % to about 0.5 wt %, alternatively 0 wt %.

In at least one embodiment, a heteroatom content of a polymer product is less than 10 wt %, such as less than 5 wt %, such as less than 1 wt %, such as less than 0.5 wt %, such as less than 0.1 wt %, such as from about 0.01 wt % to about 10 wt %, such as from 0.01 wt % to about 5 wt %, such as from about 0.01 wt % to about 1 wt %, such as from about 0.01 wt % to about 0.5 wt %, alternatively 0 wt %.

In at least one embodiment, a trimer byproduct may be formed. For example, a trimer byproduct is a trimeric form of a monomer (such as phenylacetylene) used for the polymerization. In at least one embodiment a trimer byproduct is 1,3,5-triphenylbenzene. In at least one embodiment, a trimer content is less than 10 wt %, such as less than 5 wt %, such as less than 1 wt %, such as less than 0.5 wt %, such as less than 0.1 wt %, such as from about 0.01 wt % to about 10 wt %, such as from 0.01 wt % to about 5 wt %, such as from about 0.01 wt % to about 1 wt %, such as from about 0.01 wt % to about 0.5 wt %, alternatively 0 wt %. In at least one embodiment, a trimer content can be reduced by increasing a concentration of a terminal alkyne in a solution. In at least one embodiment a trimer content can be at a minimum by using a neat terminal alkyne.

In at least one embodiment, a ring polymer is a ring polyalkyne. In at least one embodiment, $^1$H NMR confirms formation of a ring polyalkyne. In at least one embodiment, a ring polyalkyne does not have a detectable level of end groups, according to $^1$H NMR. In at least one embodiment, end group resonances relative to methine proton resonances can be about 10% or less, such as about 5% or less, such as about 1% or less, such as about 0.1% or less, such as 0%, based on total resonances.

In at least one embodiment, a ring polymer is a ring poly(phenylacetylene). In at least one embodiment, $^1$H nuclear magnetic resonance (NMR) confirms formation of a ring poly(phenylacetylene). In at least one embodiment, a ring poly(phenylacetylene) does not have a detectable level of end groups, according to $^1$H NMR. In at least one embodiment, end group resonances relative to methine proton resonances can about 10% or less, such as about 5% or less, such as about 1% or less, such as about 0.1% or less, such as 0%, based on total resonances.

In at least one embodiment, a ring poly(phenylacetylene) has a methine proton signal measured from about 5.6 ppm to about 6.2 ppm, such as about 5.9 ppm, indicating methine protons on a polymer backbone. In at least one embodiment, a ring poly(phenylacetylene) has phenyl proton signals measured from about 6.2 ppm to about 7.2 ppm indicating phenyl protons on a phenyl group attached to a polymer backbone. In at least one embodiment, a ratio of phenyl proton signals to a methine proton signal is from about 4.5 to about 5.5, such as from about 4.8 to about 5.2, such as from about 4.9 to about 5.1, such as about 5. A poly(phenylacetylene) may have a ratio of phenyl protons to methine protons of about 5.

Often, the physical properties of a ring polymer are different from those of a linear polymer of the same composition (monomer, comonomer, comonomer wt % and distribution) and the same molecular weight (Mw) and Mw/Mn. Examples of properties that may differ include bulk melting point ($T_m$), glass transition temperature ($T_g$), intrinsic viscosity, radius of gyration, and diffusion constant. In at least one embodiment, the Tm of the ring polymer may differ in absolute value from that of its linear analogue by about 25° C. or less, such as about 10° C. or less, such as about 5° C. or less. In at least one embodiment, values of $T_m$ of the ring polymer and its linear analogue may be about equal. $T_m$ and $T_g$ are measured by differential scanning calorimetry (DSC), as follows.

The DSC procedure uses a thoroughly dried test sample (e.g., 2-10 mg) held in a hermetic aluminum test pan with nitrogen purge of about 50 ml/min. The pan is heated at a rate of 10° C./min, and the heat flow of the test pan is determined relative to an empty reference pan. Melting data (first heat) is acquired by heating the sample to at least 30° C. above its melting temperature, typically 300° C., at a heating rate of 10° C./min. The sample is held for at least 5 minutes at this temperature to destroy its thermal history. Crystallization data are acquired by cooling the sample from the melt to at least 50° C. below the crystallization temperature, typically −100° C., at a cooling rate of 10° C./min. The sample is held at this temperature for at least 5 minutes, and finally heated at 10° C./min to acquire additional melting data (second heat). The melting temperature (Tm) reported is the peak melting temperature from the second heat unless otherwise specified. $T_g$ is measured as the midpoint of the respective endotherm or exotherm in the second heating ramp as described in ASTM D7426.

In at least one embodiment, a $T_g$ of a ring polymer differs from that of a $T_g$ of an equivalent linear analogue in absolute value by about 50° C. to about 100° C., alternatively from about 25° C. to about 50° C., alternatively from about 1° C. to about 25° C. In at least one embodiment, values of $T_g$ of the ring polymer and its linear analogue may be about equal.

Intrinsic viscosity (η) is determined according to ASTM D5225 using a high temperature Agilent (or Viscotek Corporation) viscometer, which has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, $[\eta]$, at each point in the chromatogram is calculated from the equation $[\eta]=\eta_S/c$, where c is concentration and is determined from the DRI output. The average intrinsic viscosity, $[\eta]_{avg}$, of the sample is calculated by:

$$[\eta]_{avg} = \frac{\Sigma\, c_i[\eta]_i}{\Sigma\, c_i}$$

where the summations are over the chromatographic slices, i, between the integration limits. The viscosity molecular weight at each point is calculated as $M=K_{PS}M^{\alpha_{Ps}+1}/[\eta]$, where $\alpha_{ps}$ is 0.67 and $K_{ps}$ is 0.000175.

In at least one embodiment, a ratio of $\eta_{avg}$ of a ring polymer in dilute solution relative to an equivalent linear analogue may be from about 0.5 to about 1, such as from about 0.5 to about 0.95, such as from about 0.5 to about 0.9, such as from about 0.5 to about 0.8, such as from about 0.5 to about 0.7, such as from about 0.5 to about 0.6, alternatively from about 0.6 to about 0.7, alternatively from about 0.7 to about 0.8, alternatively from about 0.8 to about 0.9, alternatively from about 0.9 to about 0.95, alternatively from about 0.95 to about 1.

In at least one embodiment, radius of gyration ($R_g$) can be directly determined by measuring change in scattered light intensity with observation angle according to ASTM D4001. In at least one embodiment, radius of gyration ($R_g$) can be estimated from viscometry data by utilizing the Flory-Fox equation. (In event of conflict between the ASTM D4001 method and Flory-Fox equation, the ASTM D 4001 method shall be used.) In at least one embodiment, a ring polymer has an $R_g$ that is less than a linear analogue, which increases diffusion and decreases intrinsic viscosity. In at least one embodiment, a ratio of $R_g$ of a ring polymer relative to an equivalent linear analogue may be from about 0.4 to about 0.8, such as from about 0.5 to about 0.7, such as from about 0.5 to about 0.6, alternatively from about 0.6 to about 0.7.

Hydrogenation Methods

In at least one embodiment, a ring polymer is dissolved in a solvent (such as anhydrous toluene) forming a ring polymer solution. In at least one embodiment, a ring polymer solution is degassed. In at least one embodiment, a metal catalyst is added to a ring polymer solution. In one or more embodiments, the metal catalyst can be or include palladium, platinum, or nickel without limitation, such as in the form of Pd/C, $PtO_2$, or Ra—Ni, respectively. A loading of the catalyst can be about 5 wt % or greater, such as from about 5 wt % to about 20 wt %, such as from about 10 wt % to about 15 wt %, based on total weight of the ring polymer.

In at least one embodiment, a ring polymer solution is purged three or more times with $H_2$. In at least one embodiment a $H_2$ purging pressure is about 100 psi or greater, such as from about 100 psi to about 1,000 psi. In at least one embodiment, a ring polymer solution is stirred.

In at least one embodiment, a hydrogenation is performed at a temperature of about 60° C. or greater, such as from about 60° C. to about 180° C., such as from about 60° C. to about 105° C., such as from about 75° C. to about 90° C., such as about 75° C., alternatively about 90° C., alternatively from about 150° C. to about 180° C., such as about 180° C.

In at least one embodiment, a hydrogenation is performed at a pressure of from about 500 psi to about 1,200 psi, such as from about 750 psi to about 900 psi, such as about 750 psi, alternatively about 900 psi, alternatively from about 900 psi to about 1,100 psi, such as about 1,000 psi.

In at least one embodiment, a hydrogenation is performed for a time of about 24 hours or greater, such as from about 24 hours to about 4 weeks, such as from about 24 hours to about 168 hours, such as from about 72 hours to about 168 hours, such as from about 96 hours to about 144 hours, such as from about 120 hours to about 144 hours, alternatively from about 2 weeks to about 4 weeks, such as from about 3 weeks to about 4 weeks, such as about 4 weeks.

In at least one embodiment, additional catalyst is added during hydrogenation, such as from about every 168 hours or less, such as from every 24 hours to about every 168 hours, such as from about every 24 hours to about every 72 hours, such as about every 48 hours, alternatively about every 120 hours.

In at least one embodiment, a hydrogenated ring polymer is filtered through diatomaceous earth to remove the catalyst. In at least one embodiment, a hydrogenated ring polymer is concentrated via rotary evaporation. In at least one embodiment, a hydrogenated ring polymer is added dropwise to cold methanol to obtain a solid precipitate. In at least one embodiment, a solid precipitate is collected via vacuum filtration and dried overnight under high vacuum yielding a hydrogenated product.

Hydrogenation Products

Ring polyalkynes of the present disclosure can be hydrogenated to form corresponding ring polyalkanes for use as viscosity modifiers or as lubricants. In at least one embodiment, hydrogenation can convert C—C double bonds of a polyalkyne backbone to C—C single bonds. In at least one embodiment, hydrogenation of ring poly(phenylacetylene) can convert C—C double bonds on phenyl rings attached to a poly(phenylacetylene) backbone to C—C single bonds. In at least one embodiment, hydrogenation can be confirmed by NMR spectra illustrating the absence of a methine proton signal at 5.9 ppm (and absence of phenyl proton signals from 6.5 to 8 ppm). In at least one embodiment, a portion of olefin resonances remaining after hydrogenation is about 10% or less, such as about 5% or less, such as about 1% or less, such as about 0.1% or less, such as 0%, based on total resonances. In at least one embodiment, a hydrogenated ring polyalkyne can have unique properties relative to an equivalent non-hydrogenated analogue, such that hydrogenated polyalkynes are advantageous for use as viscosity modifiers or as lubricants.

Additives

Ring polymers of the present disclosure may be mixed with one or more additives to form a ring polymer composition. The additives may include reinforcing and non-reinforcing fillers, antioxidants, stabilizers, processing oils (or other solvent(s)), compatibilizing agents, lubricants (e.g., oleamide), antiblocking agents, antistatic agents, waxes, coupling agents for the fillers and/or pigment, pigments, flame retardants, antioxidants, or other processing aids, or combination(s) thereof.

Ring polymer compositions of the present disclosure can include additives such that the additives (e.g., fillers of the present disclosure (present in a composition)) have an average agglomerate size of less than 50 microns, such as less than 40 microns, such as less than 30 microns, such as less than 20 microns, such as less than 10 microns, such as less than 5 microns, such as less than 1 micron, such as less than 0.5 microns, such as less than 0.1 microns, based on a 1 cm×1 cm cross section of a ring polymer composition as observed using scanning electron microscopy.

In at least one embodiment, a ring polymer composition may include fillers and coloring agents. Exemplary materials include inorganic fillers such as calcium carbonate, clays, silica, talc, titanium dioxide or carbon black. Any type of carbon black can be used, such as channel blacks, furnace blacks, thermal blacks, acetylene black, lamp black and the like.

In at least one embodiment, a ring polymer composition may include flame retardants, such as calcium carbonate, inorganic clays containing water of hydration such as aluminum trihydroxides ("ATH") or Magnesium Hydroxide.

In at least one embodiment, a ring polymer composition may include UV stabilizers, such as titanium dioxide or Tinuvin® XT-850. The UV stabilizers may be introduced into a roofing composition as part of a masterbatch. For example, UV stabilizer may be pre-blended into a masterbatch with a thermoplastic resin, such as polypropylene, or a polyethylene, such as linear low density polyethylene.

Still other additives may include antioxidant and/or thermal stabilizers. In at least one embodiment, processing and/or field thermal stabilizers may include IRGANOX® B-225 and/or IRGANOX® 1010 available from BASF.

In at least one embodiment, a ring polymer composition may include a polymeric processing additive. The processing additive may be a polymeric resin that has a very high melt flow index. These polymeric resins can include both linear and branched polymers that can have a melt flow rate that is about 500 dg/min or more, such as about 750 dg/min or more, such as about 1,000 dg/min or more, such as about 1,200 dg/min or more, such as about 1,500 dg/min or more. Mixtures of various branched or various linear polymeric processing additives, as well as mixtures of both linear and branched polymeric processing additives, can be employed. Reference to polymeric processing additives can include both linear and branched additives unless otherwise specified. Linear polymeric processing additives can include polypropylene homopolymers, and branched polymeric processing additives can include diene-modified polypropylene polymers. Similar processing additives are disclosed in U.S. Pat. No. 6,451,915, which is incorporated herein by reference for purpose of U.S. patent practice.

In at least one embodiment, a ring polymer composition of the present disclosure may optionally include reinforcing and non-reinforcing fillers, antioxidants, stabilizers, rubber processing oil, lubricants, antiblocking agents, anti-static agents, waxes, foaming agents, pigments, flame retardants, nucleating agents, and other processing aids known in the rubber compounding art. These additives can comprise up to about 50 weight percent of the total composition.

Fillers and extenders that can be utilized include conventional inorganics such as calcium carbonate, clays, silica, talc, titanium dioxide, carbon black, a nucleating agent, mica, wood flour, and the like, and blends thereof, as well as inorganic and organic nanoscopic fillers.

Additional Aspects

The present disclosure provides, among others, the following aspects, each of which may be considered as optionally including any alternate aspects.

Clause 1. A method of forming a ring polymer comprising: combining an alkylidyne catalyst compound and a terminal alkyne to form a mixture under reaction conditions to form the ring polymer.

Clause 2. The method of Clause 1, wherein the alkylidyne has the formula $(R^1)(R^2)(R^3)MCR^4$, wherein:

M is a metal selected from the group consisting of: tungsten and molybdenum, each of $R^1$, $R^2$, and $R^3$ are independently selected from the group consisting of: alkoxide, halide, oxide, nitride, and sulfide, and $R^4$ is selected from the group consisting of: H, an aliphatic group having from 1 to 20 carbons, an aromatic group having from 1 to 20 carbons, and a heteroaryl group having from 1 to 20 carbons, wherein the heteroatom is selected from nitrogen, oxygen, boron, and sulfur.

Clause 3. The method of Clauses 1 or 2, wherein the mixture is substantially free of solvent.

Clause 4. The method of any of Clauses 1 to 3, wherein combining comprises combining the terminal alkyne as a solution having about 1 wt % or greater of the terminal alkyne.

Clause 5. The method of any of Clauses 1 to 4, wherein the terminal alkyne has the formula $RC_2H$, wherein R is selected from the group consisting of: H, an alkyl group having from 1 to 20 carbon atoms, a cycloalkyl group having from 3 to 20 carbon atoms, an aromatic group having from 6 to 20 carbon atoms, an alkenyl group having from 2 to 20 carbon atoms, and an alkynyl group having from 2 to 20 carbon atoms.

Clause 6. The method of any of Clauses 1 to 5, wherein R is substituted with a heteroatom selected from the group consisting of: halogen, oxygen, nitrogen, sulfur, silicon and combination(s) thereof.

Clause 7. The method of any of Clauses 1 to 6, wherein the terminal alkyne is selected from the group consisting of: phenylacetylene and 1-decyne.

Clause 8. The method of any of Clauses 1 to 7, wherein the alkylidyne is tris(t-butoxy)tungsten propylidyne.

Clause 9. The method of any of Clauses 1 to 8, wherein the alkylidyne is tris(t-butoxy)tungsten neopentylidyne.

Clause 10. The method of any of Clauses 1 to 9, wherein the reaction conditions comprise a time of about 0.25 h or greater and a temperature of about 25° C. or greater.

Clause 11. The method of any of Clauses 1 to 10, wherein a molar ratio of the terminal alkyne to the alkylidyne is about 100 or greater.

Clause 12. The method of any of Clauses 1 to 11, wherein the molar ratio is from about 250 to about 10,000.

Clause 13. The method of any of Clauses 1 to 12, further comprising:
  stirring the mixture;
  quenching the mixture with a protic material, such as an alcohol, such as 1-octanol;
  flash evaporating excess monomer from the mixture by performing at least one of heating the mixture, applying a vacuum pressure, or combination(s) thereof;
  optionally washing the mixture with a solvent; and
  optionally collecting the ring polymer via filtration.

Clause 14. The method of any of Clauses 1 to 13, wherein a reaction yield of the ring polymer is about 20% or greater.

Clause 15. The method of any of Clauses 1 to 14, wherein a size of the ring polymer is from about 25 to about 75 mer units.

Clause 16. The method of any of Clauses 1 to 15, wherein a polydispersity index (Mw/Mn) of the ring polymer is from about 1.5 to about 2.

Clause 17. The method of any of Clauses 1 to 16, wherein the terminal alkyne consists of carbon and hydrogen atoms.

Clause 18. A method of forming a ring polymer, comprising:
  forming a reaction mixture by:
    introducing an alkylidyne to a reaction vessel, wherein the alkylidyne has the formula $(R^1)(R^2)(R^3)MCR^4$, wherein:
      M is a metal selected from the group consisting of: tungsten and molybdenum,
      each of $R^1$, $R^2$, and $R^3$ is independently selected from the group consisting of: alkoxide, halide, oxide, nitride, and sulfide, and
      $R^4$ is selected from the group consisting of: H, an aliphatic group having from 1 to 20 carbons, an aromatic group having from 1 to 20 carbons, and a heteroaryl group having from 1 to 20 carbons, wherein the heteroatom is selected from the group consisting of nitrogen, oxygen, boron, and sulfur; and
    introducing a terminal alkyne to the reaction vessel; and
  mixing the reaction mixture under reaction conditions to form the ring polymer.

Clause 19. The method of Clause 18, wherein the terminal alkyne has the formula $RC_2H$, wherein R is selected from the group consisting of: H, an alkyl group having from 1 to 20 carbon atoms, a cycloalkyl group having from 3 to 20 carbon atoms, an aromatic group having from 6 to 20 carbon atoms, an alkenyl group having from 2 to 20 carbon atoms, and an alkynyl group having from 2 to 20 carbon atoms.

Clause 20. The method of Clauses 18 or 19, wherein the reaction conditions comprise a time of about 8 h or greater and a temperature of about 25° C. or greater.

Clause 21. A method of forming a ring polymer, comprising:
  forming a reaction mixture by:
    introducing an alkylidyne to a reaction vessel; and
    introducing a terminal alkyne to the reaction vessel, wherein the terminal alkyne has the formula $RC_2H$, wherein R is selected from the group consisting of: H, an alkyl group having from 1 to 20 carbon atoms, a cycloalkyl group having from 3 to 20 carbon atoms, an aromatic group having from 6 to 20 carbon atoms, an alkenyl group having from 2 to 20 carbon atoms, and an alkynyl group having from 2 to 20 carbon atoms; and
  mixing the reaction mixture under reaction conditions to form the ring polymer.

Clause 22. The method of Clause 21, wherein the alkylidyne has the formula $(R^1)(R^2)(R^3)MCR^4$, wherein:
  M is a metal selected from the group consisting of: tungsten and molybdenum,
  each of $R^1$, $R^2$, and $R^3$ is independently selected from the group consisting of: alkoxide, halide, oxide, nitride, and sulfide, and
  $R^4$ is selected from the group consisting of: H, an aliphatic group having from 1 to 20 carbons, an aromatic group having from 1 to 20 carbons, and a heteroaryl group having from 1 to 20 carbons, wherein the heteroatom is selected from the group consisting of nitrogen, oxygen, boron, and sulfur.

Alternately, this invention relates to:

1. A method of forming a ring polymer, comprising:
  combining an alkylidyne catalyst compound and a terminal alkyne to form a mixture under reaction conditions to form the ring polymer, wherein the alkylidyne preferably has the formula $(R^1)(R^2)(R^3)MCR^4$, wherein:
    M is a metal selected from the group consisting of: tungsten and molybdenum,
    each of $R^1$, $R^2$, and $R^3$ are independently selected from the group consisting of: alkoxide, halide, oxide, nitride, and sulfide, and
    $R^4$ is selected from the group consisting of: H, an aliphatic group having from 1 to 20 carbons, an aromatic group having from 1 to 20 carbons, and a heteroaryl group having from 1 to 20 carbons, wherein the heteroatom is selected from nitrogen, oxygen, boron, and sulfur.

2. The method of paragraph 1, wherein the mixture is substantially free of solvent.

3. The method of paragraph 1 or 2, wherein combining comprises combining the terminal alkyne as a solution having about 1 wt % or greater of the terminal alkyne.

4. The method of any of paragraphs 1 to 3, wherein the terminal alkyne has the formula $RC_2H$, wherein R is selected from the group consisting of: H, an alkyl group having from 1 to 20 carbon atoms, a cycloalkyl group having from 3 to 20 carbon atoms, an aromatic group having from 6 to 20 carbon atoms, an alkenyl group having from 2 to 20 carbon atoms, and an alkynyl group having from 2 to 20 carbon atoms.

5. The method of paragraph 4, wherein R is substituted with a heteroatom selected from the group consisting of: halogen, oxygen, nitrogen, sulfur, silicon and combination(s) thereof.

6. The method of any of paragraphs 1 to 3, wherein the terminal alkyne is selected from the group consisting of: phenylacetylene, 1-decyne, and combination(s) thereof.

7. The method of any of paragraphs 1 to 6, wherein the alkylidyne is one or more of tris(t-butoxy)tungsten propylidyne and tris(t-butoxy)tungsten neopentylidyne.

8. The method of any of paragraphs 1 to 7, wherein the reaction conditions comprise a time of about 0.25 hour or greater (such as 8 hours or greater) and a temperature of about 25° C. or greater.

9. The method of any of paragraphs 1 to 8, wherein a molar ratio of the terminal alkyne to the alkylidyne is about 100 or greater, alternately from about 250 to about 10,000.

10. The method of any of paragraphs 1 to 9, further comprising:

stirring the mixture;

quenching the mixture with a protic material, such as an alcohol, such as 1-octanol;

flash evaporating excess monomer from the mixture by performing at least one of heating the mixture, applying a vacuum pressure, or combination(s) thereof;

optionally washing the mixture with a solvent; and optionally collecting the ring polymer via filtration.

11. The method of any of paragraphs 1 to 10, wherein a reaction yield of the ring polymer is about 20% or greater.

12. The method of any of paragraphs 1 to 11, wherein a size of the ring polymer is from about 25 to about 75 mer units.

13. The method of any of paragraphs 1 to 12, wherein the ring polymer has a polydispersity index (Mw/Mn) of about 1.5 to about 2.

14. The method of any of paragraphs 1 to 13, wherein the terminal alkyne consists of carbon and hydrogen atoms.

15. The method of any of paragraphs 1 to 14, further comprising forming a reaction mixture by: introducing the alkylidyne to a reaction vessel, and introducing the terminal alkyne to the reaction vessel; and mixing the reaction mixture under reaction conditions to form the ring polymer.

EXAMPLES $^1$H NMR spectra were measured at 400 MHz frequency using typical acquisition parameters on a suitable instrument, e.g., a 400 MHz Bruker pulsed Fourier Transform NMR spectrometer equipped with a variable temperature proton detection probe operating at room temperature. Polymer samples were dissolved in $CDCl_3$ and transferred into a 5 mm glass NMR tube. Typical acquisition parameters can include a sweep width of 10 KHz, pulse width of 30 degrees, acquisition time of 2 seconds, acquisition delay of 5 seconds, and number of scans of 120. Chemical shifts were determined relative to the $CDCl_3$ signal at 7.27 ppm.

Molecular weight distribution (Mw/Mn) and molecular weight moments (Mw, Mn, Mz) were determined by using a high temperature gel permeation chromatograph (Agilent 1260 Infinity II Multi-Detector System) equipped with a refractive index detector, multiple wavelength UV-Vis detector, light scattering detector and viscometer. Three Agilent PLgel 5-lam Mixed-C columns were used to provide polymer separation. The mobile phase was tetrahydrofuran (99.9+%-grade) with 250 ppm butylated hydroxytoluene as stabilizer, with a nominal flow rate of ~1.0 mL/min and a nominal injection volume of ~200 μL. The samples were run at 40° C. The sample solution concentration was from 0.5-1.0 mg/ml. The concentration, c, at each point in the chromatogram was calculated from the baseline-subtracted signal, I, using the equation: c=αI, where α is the mass constant. The mass recovery was calculated from the ratio of the integrated area of the concentration chromatography over elution volume and the injection mass which is equal to the pre-determined concentration multiplied by injection loop volume. The conventional molecular weight (MW) was determined by combining universal calibration relationship with the column calibration which was performed with a series of monodispersed polystyrene (PS) standards ranging from 700 to 10M gm/mole. The MW at each elution volume was calculated with following equation:

$$\log M = \frac{\log(K_{PS}/K)}{\alpha + 1} + \frac{\alpha_{PS} + 1}{\alpha + 1} \log M_{PS}$$

where the variables with subscript "PS" stand for polystyrene while those without a subscript are for the test samples. In this method, $\alpha_{PS}$=0.67 and $K_{PS}$=0.000175. α and K for other materials are as calculated in the published literature (Sun, T. et al. *Macromolecules* 2001, 34, 6812), except that for purposes of this present disclosure and claims thereto, α is 0.61 and K is 0.000175 for linear polyphenylacetylene polymers. Concentrations are expressed in $g/cm^3$, molecular weight is expressed in g/mole, and intrinsic viscosity (hence K in the Mark-Houwink equation) is expressed in dL/g, unless otherwise noted.

The LS detector was an Agilent 1260 Infinity MDS Light Scattering unit. The LS molecular weight (M) at each point in the chromatogram was determined by analyzing the LS output using the Zimm model for static light scattering (Light Scattering from Polymer Solutions; Huglin, M. B., Ed.; Academic Press, 1972.):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration, $A_2$ is the second virial coefficient, $P(\theta)$ is the form factor for a monodisperse random coil, and $K_O$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system, n is the refractive index of THF at 40° C. and λ=658 nm.

A high temperature Agilent (or Viscotek Corporation) viscometer, which has four capillaries arranged in a Wheatstone bridge configuration with two pressure transducers, was used to determine specific viscosity. One transducer measures the total pressure drop across the detector, and the other, positioned between the two sides of the bridge, measures a differential pressure. The specific viscosity, $\eta_S$, for the solution flowing through the viscometer was calculated from their outputs. The intrinsic viscosity, $[\eta]$, at each point in the chromatogram was calculated from the equation $[\eta]=\eta_S/c$, where c is concentration and is determined from the IRS broadband channel output. The viscosity MW at each point was calculated as $M=K_{PS}M^{\alpha_{PS}+1}/[\eta]$, where $\alpha_{ps}$ is 0.67 and $K_{ps}$ is 0.000175.

The foregoing discussion can be further described with reference to the following non-limiting examples.

Example 1. Preparation of Ring
Poly(Phenylacetylene) Using
Tris(t-Butoxy)Tungsten Neopentylidyne In an inert atmosphere glovebox, an alkylidyne catalyst compound (i.e., tris(t-butoxy)tungsten neopentylidyne)

(40.6 mg; 86.0 μmol; 1 eq) was weighed into a vial. A terminal alkyne (i.e., phenylacetylene) (5.00 mL; 45.6 mmol; 530 eq) was added to the vial via syringe to form a mixture. The vial was equilibrated at a temperature of 25° C. The mixture was stirred for 21.5 hours forming a viscous solution having a red color. After 21.5 hours, the mixture was quenched with 20 drops of 1-octanol, and the mixture was diluted with pentane. The pentane was decanted to yield a thick solution having a black color, which was dissolved in 15 mL of toluene. The resulting toluene solution was added dropwise to 150 mL of pentane (vigorously stirred). A solid precipitate polymer product was collected by filtration. The polymer product was washed with acetone and dried overnight under a fume hood. The polymer product was further dried in a vacuum oven at 90° C. overnight. The reaction yield was 905 mg of ring poly(phenylacetylene).

Table 1 shows synthesis conditions of ring poly(phenylacetylene) prepared using tris(t-butoxy)tungsten neopentylidyne, as well as Mn, Mw, Mz, and Mw/Mn of the ring polymer products, measured by GPC. The reaction is shown below (Scheme 1) including structures of the tris(t-butoxy)tungsten neopentylidyne, the phenylacetylene, and the ring poly(phenylacetylene).

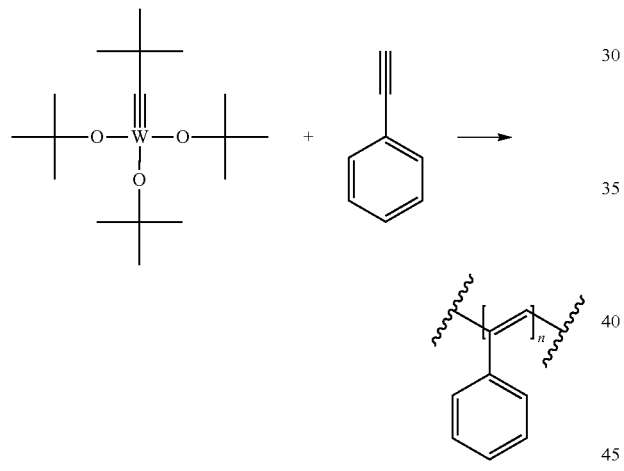

Scheme 1.

FIG. 1A is a $^1$H NMR spectrum 100a illustrating formation of a ring poly(phenylacetylene), according to at least one embodiment. The NMR spectrum 100a confirms formation of the ring poly(phenylacetylene) without a detectable level of end groups. The NMR spectrum 100a includes a first signal 110 measured from about 5.6 ppm to about 6.2 ppm, such as about 5.9 ppm, corresponding to methine protons attached to the polymer backbone. The NMR spectrum 100a further includes a second signal 120 measured from about 6.2 ppm to about 7.2 ppm corresponding to phenyl protons. A ratio of the second signal 120 to the first signal 110 is about 4.9. Methine protons can have an NMR signal from about 4.5 to about 6.5, and phenyl protons can have an NMR signal from about 6.5 to about 8. The poly(phenylacetylene) is expected to have a ratio of phenyl protons to methine protons of about 5. Thus, the NMR spectrum 100a quantitatively confirms formation of the ring poly(phenylacetylene). Signals at 0.9 ppm (130), 1.27 ppm (140), and 2.37 ppm (150) are attributed to solvents (e.g., pentane and toluene).

Figure 1B:
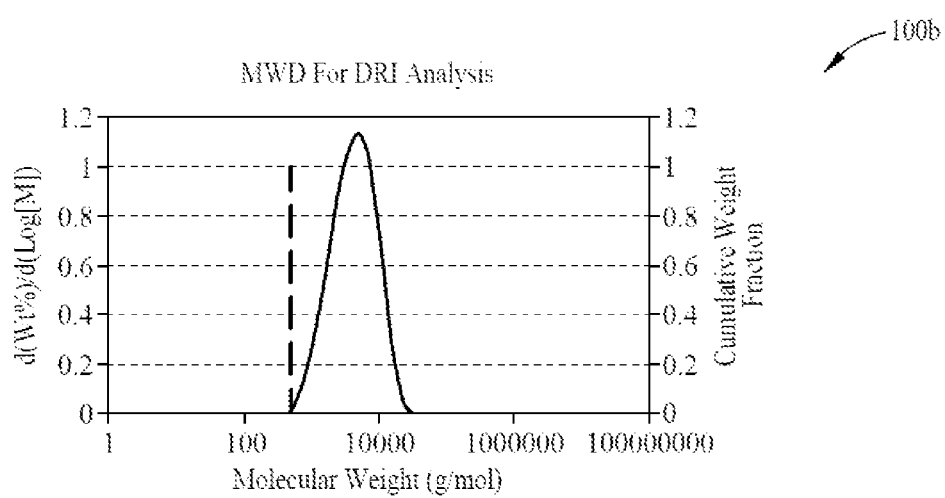
FIG. 1B is a GPC chromatogram of the ring poly(phenylacetylene) of FIG. 1A, according to at least one embodiment.

FIG. 1B is a GPC chromatogram 100b of the ring poly(phenylacetylene) corresponding to the NMR spectrum 100a of FIG. 1A, according to at least one embodiment. The GPC chromatogram 100b indicates a maximum molecular weight of about 30,000 g/mol, or a maximum size of about 300 mer units. The GPC chromatogram 100b confirms that the ring poly(phenylacetylene) has a narrow molecular weight distribution of about 1.74.

Example 2. Preparation of Ring Poly(Phenylacetylene) Using Tris(t-Butoxy)Tungsten Propylidyne In an inert atmosphere glovebox, the alkylidyne catalyst compound (i.e., tris(t-butoxy)tungsten propylidyne) (30.5 mg; 68.6 μmol; 1 eq) was weighed into a vial. The terminal alkyne (i.e., phenylacetylene) (3.60 mL; 32.8 mmol; 477 eq) was added to the vial via syringe to form a mixture. The vial was equilibrated at a temperature of 25° C. The mixture was stirred for 21.5 hours forming a viscous solution having a red color. After 21.5 hours, the mixture was quenched with 20 drops of 1-octanol, and the mixture was diluted with pentane. The pentane was decanted to yield a thick solution having a black color, which was dissolved in 40 mL of toluene. The resulting toluene solution was added dropwise to 400 mL of pentane (vigorously stirred). The solid precipitate was collected by filtration. The resulting polymer was washed with acetone and dried overnight under the hood. The polymer was further dried in a vacuum oven at 90° C. overnight.

Table 1 shows synthesis conditions of ring poly(phenylacetylene) prepared using tris(t-butoxy)tungsten propylidyne, as well as Mn, Mw, Mz, and Mw/Mn, measured by GPC. The reaction is shown below (Scheme 2) including structures of the tris(t-butoxy)tungsten propylidyne, the phenylacetylene, and the ring poly(phenylacetylene).

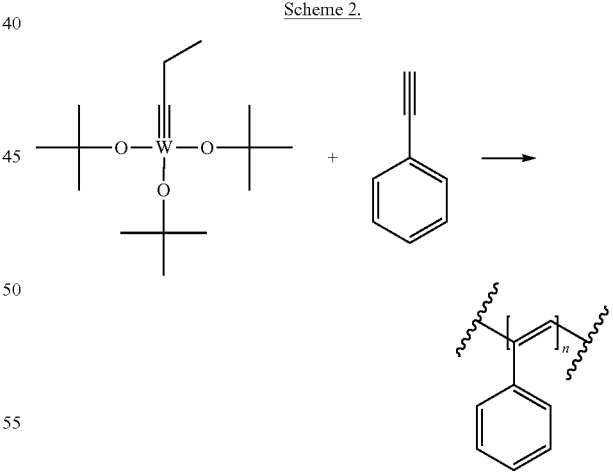

Scheme 2.

Figure 2A:
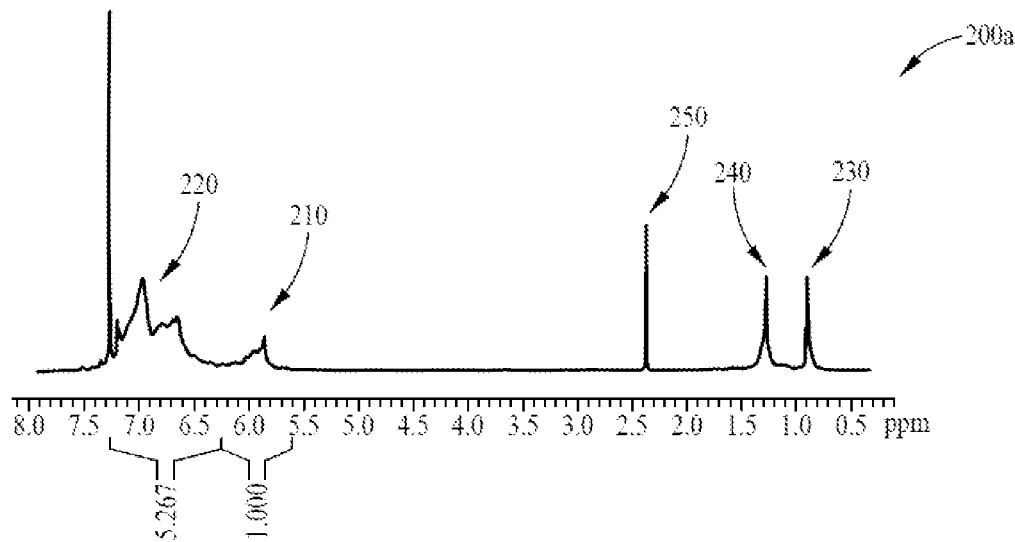
FIG. 2A is a $^1$H NMR spectrum illustrating formation of a ring poly(phenylacetylene), according to at least one embodiment.

FIG. 2A is a $^1$H NMR spectrum 200a illustrating formation of a ring poly(phenylacetylene), according to at least one embodiment. The NMR spectrum 200a confirms formation of the ring poly(phenylacetylene) without a detectable level of end groups. The NMR spectrum 200a includes a first signal 210 measured from about 5.6 ppm to about 6.2 ppm, such as about 5.9 ppm, corresponding to methine protons attached to the polymer backbone. The NMR spectrum 200a further includes a second signal 220 measured from about 6.2 ppm to about 7.2 ppm corresponding to phenyl protons. A ratio of the second signal 220 to the first signal 210 is about 5.2. Methine protons can have an NMR signal from about 4.5 to about 6.5, and phenyl protons can have an NMR signal from about 6.5 to about 8. The poly(phenylacetylene) is expected to have a ratio of phenyl protons to methine protons of about 5. Thus, the NMR spectrum 200a quantitatively confirms formation of the ring poly(phenylacetylene). Signals at 0.9 ppm (230), 1.27 ppm (240), and 2.37 ppm (250) are attributed to solvents (e.g., pentane and toluene).

Figure 2B:
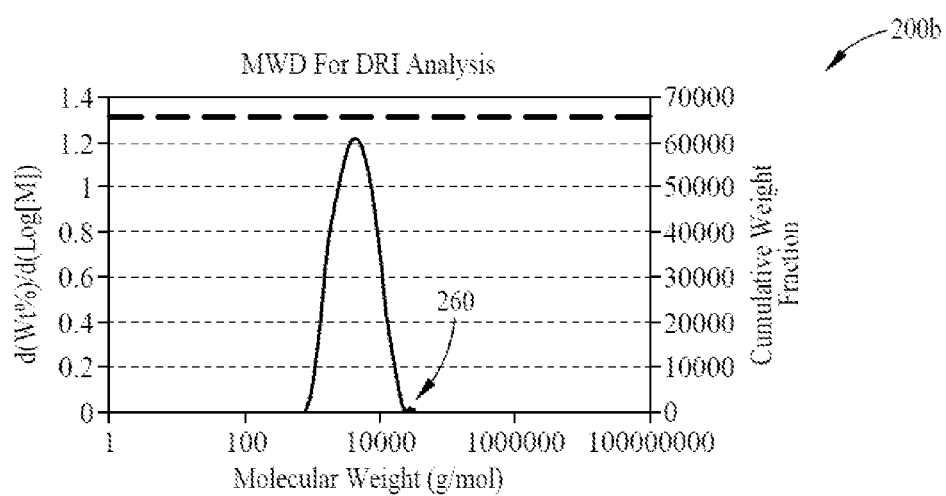
FIG. 2B is a GPC chromatogram of the ring poly(phenylacetylene) of FIG. 2A, according to at least one embodiment.

FIG. 2B is a GPC chromatogram 200b of the ring poly (phenylacetylene) corresponding to the NMR spectrum 200a of FIG. 2A, according to at least one embodiment. The GPC chromatogram 200b indicates that Example 2 has a maximum molecular weight of about 30,000 g/mol, or a maximum size of about 300 mer units, similar to Example 1. However, as indicated by a reduced high molecular weight tail 260, the GPC chromatogram 200b of Example 2 has fewer large molecular weight chains from about 20,000 g/mol to about 30,000 g/mol compared to Example 1, which leads to Example 2 having a lower value of Mz. The GPC chromatogram 200b confirms that the ring poly(phenylacetylene) has a narrow molecular weight distribution of about 1.53.

TABLE 1

Ring poly(phenylacetylene) synthesis conditions.

| | Alkylidyne Catalyst (µmol) | Terminal Alkyne (mmol) | Mn (g/mol) | Mw (g/mol) | Mz (g/mol) | Mw/Mn |
|---|---|---|---|---|---|---|
| Example 1 | 86.0+ | 45.6* | 3155 | 5493 | 8453 | 1.74 |
| Example 2 | 68.6# | 32.8* | 3440 | 5261 | 7616 | 1.53 |

+Tris(t-butoxy)tungsten neopentylidyne
Tris(t-butoxy)tungsten propylidyne
*Phenylacetylene Overall, ring polymers of the present disclosure exhibit unique rheological and bulk properties compared to their equivalent linear analogues. In at least one aspect, ring polymers of the present disclosure can be used in blends with various other polymers, usually following hydrogenation of the ring polymers, to modify bulk properties of the other polymers. In at least one aspect, ring polymers of the present disclosure can be used as lubricants or as viscosity modifiers in lubricants. In at least one aspect, a synthesis method of the present disclosure can be performed in neat monomer (e.g., in the absence of additional solvent), which improves yield. In at least one aspect, a synthesis method can provide good yield of the ring polymers in relatively short reaction times. In at least one aspect, a synthesis method is scalable to industrial production methods. In at least one aspect, a synthesis method can be performed without reactive end group functionalities (end cap groups) for ring closing thus circumventing the use of additional reagents (such as the end caps) and timely addition of the end caps to the reaction to provide the synthesis of the ring polymers. Therefore, ring polymers of the present disclosure may optionally consist only of carbon and hydrogen atoms without heteroatom-substituted hydrocarbon groups. In at least one aspect, catalysts of the present disclosure are relatively simple to make and can be easily modified.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

I claim:

1. A method of forming a ring polymer, comprising:
combining an alkylidyne catalyst compound and a terminal alkyne to form a mixture under reaction conditions to form the ring polymer, wherein the alkylidyne catalyst compound has the formula $(R^1)(R^2)(R^3)MCR^4$, wherein:
M is a metal selected from the group consisting of: tungsten and molybdenum,
each of $R^1$, $R^2$, and $R^3$ are independently selected from the group consisting of: alkoxide, halide, oxide, nitride, and sulfide, and
$R^4$ is selected from the group consisting of: H, an aliphatic group having from 1 to 20 carbons, an aromatic group having from 1 to 20 carbons, and a heteroaryl group having from 1 to 20 carbons, wherein the heteroatom is selected from nitrogen, oxygen, boron, and sulfur.

2. The method of claim 1, wherein the mixture is substantially free of solvent.

3. The method of claim 1, wherein combining comprises combining the terminal alkyne as a solution having about 1 wt % or greater of the terminal alkyne.

4. The method of claim 1, wherein the terminal alkyne has the formula $RC_2H$, wherein R is selected from the group consisting of: H, an alkyl group having from 1 to 20 carbon atoms, a cycloalkyl group having from 3 to 20 carbon atoms, an aromatic group having from 6 to 20 carbon atoms, an alkenyl group having from 2 to 20 carbon atoms, and an alkynyl group having from 2 to 20 carbon atoms.

5. The method of claim 4, wherein R is substituted with a heteroatom selected from the group consisting of: halogen, oxygen, nitrogen, sulfur, silicon and combination(s) thereof.

6. The method of claim 4, wherein the terminal alkyne is selected from the group consisting of: phenylacetylene, 1-decyne, and combination(s) thereof.

7. The method of claim 1, wherein the alkylidyne catalyst compound is tris(t-butoxy)tungsten propylidyne.

8. The method of claim 7, wherein the alkylidyne catalyst compound is tris(t-butoxy)tungsten neopentylidyne.

9. The method of claim 1, wherein the reaction conditions comprise:
a time of about 0.25 hours or greater; and
a temperature of about 25° C. or greater.

10. The method of claim 1, wherein a molar ratio of the terminal alkyne to the alkylidyne catalyst compound is about 100 or greater.

11. The method of claim 10, wherein the molar ratio is from about 250 to about 10,000.

12. The method of claim 1, further comprising:
stirring the mixture;
quenching the mixture with a protic molecule;
flash evaporating excess monomer from the mixture by performing at least one of heating the mixture, applying a vacuum pressure, or combination(s) thereof;
optionally washing the mixture with a solvent; and
optionally collecting the ring polymer via filtration.

13. The method of claim 1, wherein a reaction yield of the ring polymer is about 20% or greater.

14. The method of claim 1, wherein a size of the ring polymer is from about 25 to about 75 mer units.

15. The method of claim 1, wherein the ring polymer has an Mw/Mn of about 1.5 to about 2.

16. A method of forming a ring polymer, comprising:
forming a reaction mixture by:
introducing an alkylidyne to a reaction vessel, wherein the alkylidyne has the formula $(R^1)(R^2)(R^3)MCR^4$, wherein:
M is a metal selected from the group consisting of: tungsten and molybdenum,
each of $R^1$, $R^2$, and $R^3$ is independently selected from the group consisting of: alkoxide, halide, oxide, nitride, and sulfide, and
$R^4$ is selected from the group consisting of: H, an aliphatic group having from 1 to 20 carbons, an aromatic group having from 1 to 20 carbons, and a heteroaryl group having from 1 to 20 carbons, wherein the heteroatom is selected from the group consisting of: nitrogen, oxygen, boron, and sulfur; and
introducing a terminal alkyne to the reaction vessel; and
mixing the reaction mixture under reaction conditions to form the ring polymer.

17. The method of claim 16, wherein the terminal alkyne has the formula $RC_2H$, wherein R is selected from the group consisting of: H, an alkyl group having from 1 to 20 carbon atoms, a cycloalkyl group having from 3 to 20 carbon atoms, an aromatic group having from 6 to 20 carbon atoms, an alkenyl group having from 2 to 20 carbon atoms, and an alkynyl group having from 2 to 20 carbon atoms.

18. The method of claim 17, wherein the reaction conditions comprise:
a time of about 8 hours or greater; and
a temperature of about 25° C. or greater.

19. A method of forming a ring polymer, comprising:
forming a reaction mixture by:
introducing an alkylidyne to a reaction vessel; and
introducing a terminal alkyne to the reaction vessel, wherein the terminal alkyne has the formula $RC_2H$, wherein R is selected from the group consisting of: H, an alkyl group having from 1 to 20 carbon atoms, a cycloalkyl group having from 3 to 20 carbon atoms, an aromatic group having from 6 to 20 carbon atoms, an alkenyl group having from 2 to 20 carbon atoms, and an alkynyl group having from 2 to 20 carbon atoms; and
mixing the reaction mixture under reaction conditions to form the ring polymer
wherein the alkylidyne has the formula $(R^1)(R^2)(R^3)MCR^4$, wherein:
M is a metal selected from the group consisting of: tungsten and molybdenum,
each of $R^1$, $R^2$, and $R^3$ is independently selected from the group consisting of: alkoxide, halide, oxide, nitride, and sulfide, and
$R^4$ is selected from the group consisting of: H, an aliphatic group having from 1 to 20 carbons, an aromatic group having from 1 to 20 carbons, and a heteroaryl group having from 1 to 20 carbons, wherein the heteroatom is selected from the group consisting of nitrogen, oxygen, boron, and sulfur.

* * * * *